United States Patent
Jales Costa et al.

(10) Patent No.: US 10,696,307 B2
(45) Date of Patent: Jun. 30, 2020

(54) ANOMALY DETECTOR FOR VEHICLE CONTROL SIGNALS

(71) Applicant: Ford Global Technologies, LLC, Dearborn, MI (US)

(72) Inventors: Bruno Jales Costa, Sunnyvale, CA (US); Gaurav Pandey, Foster City, CA (US); Dimitar Petrov Filev, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/031,702

(22) Filed: Jul. 10, 2018

(65) Prior Publication Data

US 2020/0017116 A1    Jan. 16, 2020

(51) Int. Cl.
| | | |
|---|---|---|
| *B60W 50/04* | (2006.01) | |
| *B60W 50/02* | (2012.01) | |
| *B60W 50/029* | (2012.01) | |
| *G06N 20/00* | (2019.01) | |

(52) U.S. Cl.
CPC ...... *B60W 50/045* (2013.01); *B60W 50/0205* (2013.01); *B60W 50/029* (2013.01); *G06N 20/00* (2019.01); *B60W 2050/0215* (2013.01)

(58) Field of Classification Search
CPC .......... B60W 50/045; B60W 50/0205; B60W 50/029; B60W 2050/0215; G06N 20/00
See application file for complete search history.

(56) References Cited

U.S. PATENT DOCUMENTS

| | | | |
|---|---|---|---|
| 4,759,212 A | 7/1988 | Sawada | |
| 8,346,444 B2 | 1/2013 | Fayyad | |
| 8,712,623 B2 | 4/2014 | Sato | |
| 2006/0055234 A1* | 3/2006 | Choi | B60T 8/17616 |
| | | | 303/113.1 |
| 2010/0256835 A1 | 10/2010 | Mudalig | |
| 2019/0001777 A1* | 1/2019 | Kral | B60G 17/016 |

FOREIGN PATENT DOCUMENTS

| | | |
|---|---|---|
| WO | WO-2014148976 A1 | 9/2014 |
| WO | WO-2014157183 A1 | 2/2017 |
| WO | WO2019070535 A1 * | 4/2019 |

OTHER PUBLICATIONS

WO 2019/070535 AI (Year: 2019).*
Anomaly Detection based on Eccentricity Analysis, Plamen Angelov.
Sensor Anomaly Detection in a Nonlinear Autonomous Ground.

* cited by examiner

*Primary Examiner* — Mahmoud S Ismail
*Assistant Examiner* — Bakari Underwood
(74) *Attorney, Agent, or Firm* — David R. Stevens; Stevens Law Group

(57) ABSTRACT

A vehicle controller receives sensor outputs and identifies features in the sensor outputs. The controller determines a trajectory based on the features and generates control signals to vehicle actuators to follow the trajectory. Eccentricity of the control signals is evaluated and if it meets a threshold condition is met an intervention is performed such as discarding or modifying the control signal or initiating a safety procedure. Eccentricity may be determined using an unsupervised machine learning model. The threshold condition may be a dynamic threshold condition such as using the n-sigma approach or the Chebyshev inequality.

17 Claims, 4 Drawing Sheets

ANOMALY DETECTOR FOR VEHICLE CONTROL SIGNALS

BACKGROUND

Field of the Invention

This invention relates to control systems of autonomous vehicles.

Background of the Invention

Autonomous vehicles are an area of intense research and development. The controller of an autonomous vehicle typically receives outputs of various sensors such as cameras, RADAR sensors, LIDAR sensors, or the like. These outputs are then processed to identify road surfaces, lane boundaries, other vehicles, pedestrians, and potential obstacles. This typically requires processing a large amount of data in a very short amount of time in order to properly react to changing conditions.

It would be an advancement in the art to improve the safety of autonomous vehicles.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
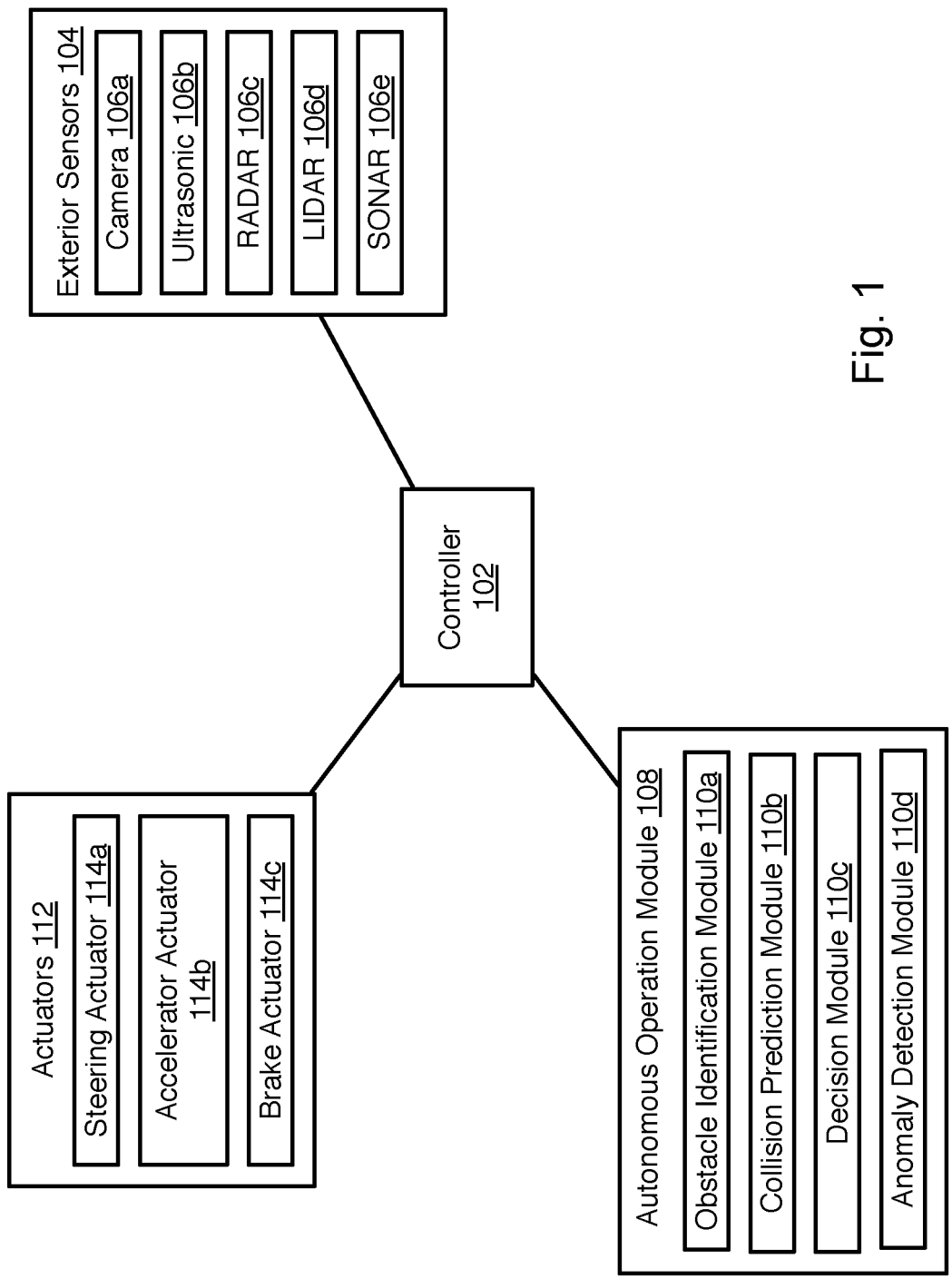
FIG. 1 is a schematic block diagram of components implementing a vehicle in accordance with an embodiment of the present invention.

Referring to FIG. 1, a vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, a controller 102 mounted in the vehicle may perform autonomous navigation and collision avoidance. The controller 102 may receive one or more outputs from one or more exterior sensors 104. For example, one or more cameras 106a may be mounted to the vehicle and output image streams received to the controller 102. In some embodiments, the exterior sensors 104 combined provide a 360 degree view around the vehicle. In other embodiments, a smaller viewing angle may be achieved by the exterior sensors 104, such as an angle between 180 and 270 degrees.

The exterior sensors 104 may include sensors such as an ultrasonic sensor 106b, a RADAR (Radio Detection and Ranging) sensor 106c, a LIDAR (Light Detection and Ranging) sensor 106d, a SONAR (Sound Navigation and Ranging) sensor 106e, and the like.

The controller 102 may execute an autonomous operation module 108 that receives the outputs of the exterior sensors 104. The autonomous operation module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

The decision module 110c may control the trajectory of the vehicle by actuating one or more actuators 112 controlling the direction and speed of the vehicle. For example, the actuators 112 may include a steering actuator 114a, an accelerator actuator 114b, and a brake actuator 114c. The configuration of the actuators 114a-114c may be according to any implementation of such actuators known in the art of autonomous vehicles.

The decision module 110c or another module may control the actuators 112 according one or more other algorithms, such as an anti-lock braking system, stability control system, traction control system, or other vehicle system.

In embodiments disclosed herein, the autonomous operation module 108 may perform autonomous navigation to a specified location, autonomous parking, and other automated driving activities known in the art.

In some embodiments, outputs of the decision module to the actuators 112 may be evaluated for anomalies as described hereinbelow. Other outputs controlling other vehicle systems (fuel delivery, engine, suspension, etc.) may also be evaluated for anomalies in the same manner. Accordingly, the autonomous operation module 108 may further include an anomaly detection module 110d that performs anomaly detection as described below.

Figure 2:
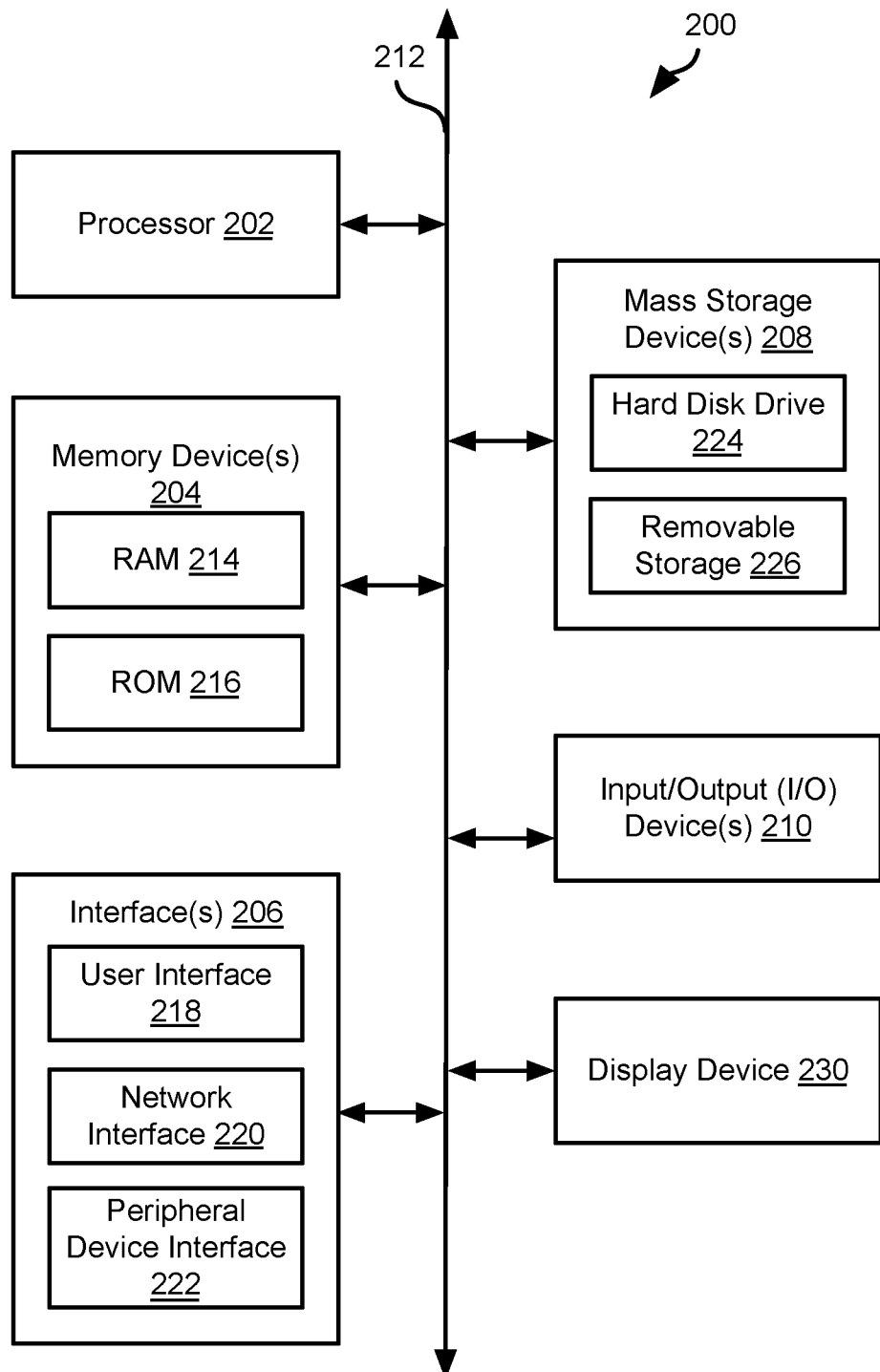
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
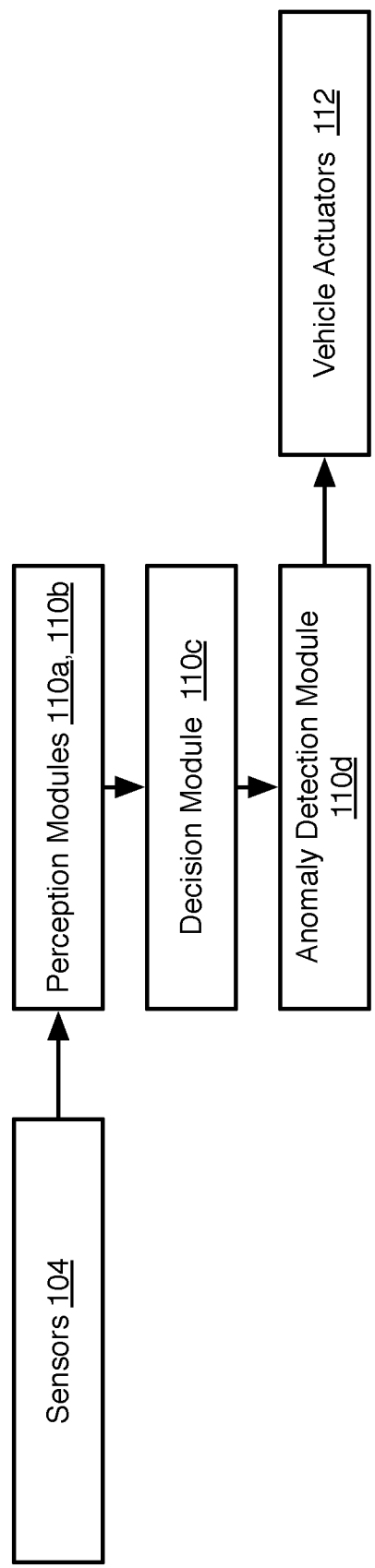
FIG. 3 illustrates components for generating control signals according to sensor outputs in accordance with an embodiment of the present invention.

FIG. 3 illustrates an example flow of control in an autonomous vehicle that includes anomaly detection according to the methods disclosed herein. For example, the exterior sensors 104 or other sensor sensing a state of the vehicle (engine sensors, drive train sensors, yaw rate sensor, roll sensor, etc.) provide their outputs to perception modules that detect features in the sensor outputs, such as obstacles, road surfaces, other vehicles, pedestrians, traffic lights, signs, etc. For example, the perception modules may perform the functions ascribed to the obstacle identification module 110a and collision prediction module 110b.

The features as detected by the perception modules 110a, 110b are input to a control algorithm that determines a trajectory of the vehicle according to the detected features. For example, the control algorithm may perform some or all of the functions ascribed to the decision module 110c.

The output of the decision module 110c are control signals to the vehicle actuators 112 or other systems of the vehicle. These control signals are monitored by the anomaly detection module 110d, which attempts to identify anomalies in the control signals that have the potential to cause passenger discomfort or otherwise compromise the safety of passengers of the vehicle.

Since the vast majority of the perception tasks (e.g. pedestrian and vehicle detection/tracking, lane marking detection, traffic light detection) are performed with the aid of some type of neural network, which may have difficulty handling uncertainty, the anomaly detection module 110d evaluates control signals (e.g. acceleration, braking, steering) generated by the control algorithm to detect anomalies, such as those that might be caused by anomalies in the perception tasks. In the illustrated approach, this is performed by evaluating the control signals to the actuators 112. In other embodiments, anomaly detection is performed by analyzing a data stream at another stage in the process of perception and generating control signals.

In this manner, the anomaly detection module 110d handles automated driving scenarios that might otherwise result in abrupt changes in the control signals, such as abrupt braking, abrupt acceleration or abrupt steering, unless such abrupt changes strictly required.

Figure 4:
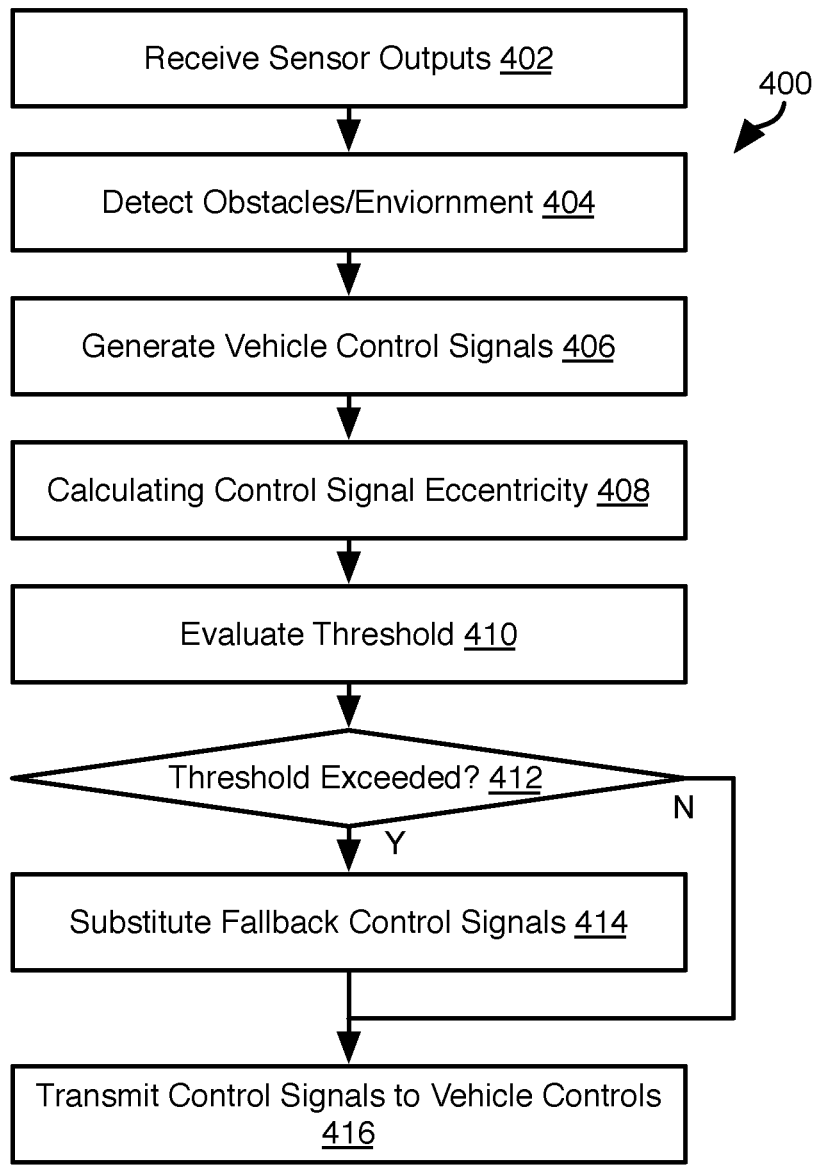
FIG. 4 is a process flow diagram of a method for detecting anomalies in control signals in accordance with an embodiment of the present invention.

Referring to FIG. 4, the illustrated method 400 may be executed by the controller 102 of a vehicle, such as the autonomous vehicle of FIG. 1 using the anomaly detection module 110d.

The method 400 include receiving 402 sensor outputs from the exterior sensors 104 or any of the other vehicle sensors discussed above.

The method 400 further include detecting 404 features in the sensor outputs such as obstacles, road surfaces, road signs, pedestrians, other vehicles, or the like. Vehicle control signals are then generated 406 for actuators 112 of the vehicle in order to traverse a trajectory determined according to the features. The control signals may be generated 406 according to any approach for controlling an autonomous vehicle known in the art. As noted above, the control signals may further include control signals for other vehicle systems as noted above.

The method 400 may further include calculating 408 eccentricity of the control signals. In particular, a set of control signals overtime may be input to an unsupervised machine learning algorithm that is thereby trained over time to determine when values in the set of control signals are anomalous. Note that this may include either of (a) determining that one or more values of a particular control signal is anomalous or (b) that the co-occurrence of a set of values for multiple control signals collectively is anomalous either with or without the value of any particular control signal being anomalous.

The unsupervised machine learning model may be trained to identify anomalies according to any approach known in the art. For example, this may include the approach for identifying anomalies in an arbitrary number of signal as described in P. Angelov, "Anomaly detection based on eccentricity analysis," 2014 IEEE Symposium on Evolving and Autonomous Learning Systems (EALS), Orlando, Fla., 2014, pp. 1-8, which is hereby incorporated herein by reference.

Any signals that are read in a data stream form (one sample per time instant) may be used in the eccentricity calculation. Hence, any control signal applied to the vehicle can be monitored by the method disclosed in this document. In some embodiments, the eccentricity calculation is only performed for those controls signals that, when changed abruptly, can cause discomfort to the passengers or even put their safety at risk. Therefore, signals such as acceleration, braking and steering controls are good candidates for this purpose.

The method 400 may include evaluating 410 one or both of the control signals and the eccentricity as determined at step 408 with respect to a threshold. The threshold may be a static threshold or a dynamic threshold. For example, the threshold may be a dynamic threshold based on past values for the eccentricity during a training period. For example, the "n-sigma rule" approach may be used, where n is specified by an operator. In another example, the Chebyshev inequality approach is used to determine a dynamic threshold, such as is described in J. G. Saw, M. Yang, and T. C. Mo, "Chebyshev inequality with estimated mean and variance," *The American Statistician*, vol. 38, no. 2, pp. 130-132, 1984, which is hereby incorporated by reference in its entirety.

If the threshold condition is found to be met 412, the method 400 may include intervening. In a simple case, an alert is generated. In a more complex case, the control signals are modified in response to the threshold condition being met. For example, a control signal that is anomalous may be modified to be within a predefined boundary. In another example, the intervention includes substituting 414 pre-defined fallback signals for the control signals and inputting the fallback signals to the actuators 112 or other vehicle systems. In another example, in the event that an anomaly is detected, the monitor can either discard a control signal, if that is an outlier, or initiate a safety procedure, if the abrupt deviation persists, such as decelerating to a safe speed or bringing the vehicle to a safe stop.

The control signals, either original or substituted according to step 414, may be transmitted 416 to their corresponding actuators 112, which then alter their states according to the control signals.

Note that the method 400 is performed "in real time." That is to say that the eccentricity analysis may be performed as the control signals are generated but before they are input to the corresponding actuators 112 or other vehicle systems. For example, the eccentricity analysis and any intervention may be performed within 0.1 to 20 milliseconds of the time control signals are generated and available at 408.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a vehicle controller:
   receiving sensor outputs from sensors of the vehicle;
   processing the sensor outputs by a control algorithm to obtain control outputs for the vehicle;
   evaluating eccentricity of the control outputs collectively with respect to a threshold condition; and
   when the control outputs meet the threshold condition, generating an intervention;
   wherein evaluating the eccentricity of the control outputs with respect to the threshold condition comprises inputting the control outputs into an unsupervised machine learning model to obtain an eccentricity metric; and
   wherein evaluating the eccentricity of the control outputs with respect to the threshold condition comprises evaluating the eccentricity metric over time with respect to an n-sigma rule condition.

2. The method of claim 1, wherein processing the outputs by the control algorithm comprises:
   detecting features in the sensor outputs;
   selecting a trajectory according to the features; and
   generating the control outputs effective to traverse the trajectory.

3. The method of claim 1, wherein the control outputs comprise control signals to a steering actuator, a braking actuator, and an accelerator actuator.

4. The method of claim 1, wherein the control algorithm comprises at least one of an anti-lock braking system, a stability control system, and a traction control system.

5. The method of claim 1, wherein the sensor outputs comprise outputs of at least one of a radio detection and ranging (RADAR) sensor, a light detection and ranging (LIDAR) sensor, and a camera.

6. A method comprising, by a vehicle controller:
   receiving sensor outputs from sensors of the vehicle;
   processing the sensor outputs by a control algorithm to obtain control outputs for the vehicle;
   evaluating eccentricity of the control outputs collectively with respect to a threshold condition; and
   when the control outputs meet the threshold condition, generating an intervention;
   wherein evaluating the eccentricity of the control outputs with respect to the threshold condition comprises inputting the control outputs into an unsupervised machine learning model to obtain an eccentricity metric; and
   wherein evaluating the eccentricity of the control outputs with respect to the threshold condition comprises evaluating the eccentricity metric over time with respect to a Chebyshev inequality.

7. The method of claim 1, wherein the intervention comprises generating an alert.

8. The method of claim 1, wherein the intervention comprises substituting fallback control signals for the control outputs.

9. A vehicle comprising:
   a plurality of sensors;
   a plurality of actuators for controlling operation of the vehicle;
   a controller coupled to the plurality of sensors and the plurality of actuators, the controller being programmed to:
   receiving sensor outputs from the plurality of sensors;
   process the sensor outputs by a control algorithm to obtain control outputs for the plurality of actuators;
   evaluating eccentricity of the control outputs with respect to a threshold condition; and
   when the control outputs meet the threshold condition, generate an intervention;
   wherein the controller is programmed to evaluate the eccentricity of the control outputs with respect to the threshold condition by evaluating the eccentricity with respect to an n-sigma rule condition.

10. The vehicle of claim 9, wherein the controller is further programmed to process the outputs by the control algorithm by:
    detecting features in the sensor outputs;
    selecting a trajectory according to the features; and generating the control outputs effective to traverse the trajectory.

11. The vehicle of claim 9, wherein the plurality of actuators comprise a steering actuator, a braking actuator, and an accelerator actuator.

12. The vehicle of claim 9, wherein the control algorithm comprises at least one of an anti-lock braking system, a stability control system, and a traction control system.

13. The vehicle of claim 9, wherein the plurality of sensors comprise at least one of a radio detection and ranging (RADAR) sensor, a light detection and ranging (LIDAR) sensor, and a camera.

14. The vehicle of claim 9, wherein the controller is programmed to evaluate the eccentricity of the control outputs with respect to the threshold condition by inputting the control outputs into an unsupervised machine learning model to obtain an eccentricity metric.

15. A vehicle comprising:
- a plurality of sensors;
- a plurality of actuators for controlling operation of the vehicle;
- a controller coupled to the plurality of sensors and the plurality of actuators, the controller being programmed to:
  - receiving sensor outputs from the plurality of sensors;
  - process the sensor outputs by a control algorithm to obtain control outputs for the plurality of actuators;
  - evaluating eccentricity of the control outputs with respect to a threshold condition; and
  - when the control outputs meet the threshold condition, generate an intervention;
- wherein the controller is programmed evaluate the eccentricity of the control outputs with respect to the threshold condition by evaluating the eccentricity metric with respect to a Chebyshev inequality.

16. The vehicle of claim 9, wherein the intervention comprises generating an alert.

17. The vehicle of claim 9, wherein the intervention comprises substituting fallback control signals for the control outputs.

* * * * *